United States Patent [19]

Rohowetz

[11] 4,228,221
[45] Oct. 14, 1980

[54] PRIMER SYSTEM

[75] Inventor: Stanley E. Rohowetz, Barrington, Ill.

[73] Assignee: American Can Company, Greenwich, Conn.

[21] Appl. No.: 26,906

[22] Filed: Apr. 4, 1979

[51] Int. Cl.² ............................................. B05D 3/06
[52] U.S. Cl. ................................. 428/469; 427/27; 427/54.1
[58] Field of Search ............... 427/54, 27; 204/158 R; 106/287.19; 260/429.5; 428/469

[56] References Cited

U.S. PATENT DOCUMENTS

| 2,943,955 | 7/1960 | Brill | 106/287.19 |
| 3,061,483 | 10/1962 | Coles et al. | 204/154 P |
| 3,361,842 | 1/1968 | Applegath et al. | 427/44 |

*Primary Examiner*—John H. Newsome
*Attorney, Agent, or Firm*—Robert P. Auber; George P. Ziehmer; Ira S. Dorman

[57] ABSTRACT

An ultraviolet treatment of organic titanates on metal surfaces to increase adhesion of inks and coatings is disclosed wherein the adhesion of subsequently applied inks and coatings is improved. The method includes an initial treatment of the lubricated metal substrate with an organic titanate such as tetrakis (2-ethyl hexyl) titanate and then exposing same to ultraviolet light to accelerate the reaction of the titanate with the metal surface.

16 Claims, 2 Drawing Figures

PRIMER SYSTEM

BACKGROUND OF THE INVENTION

Certain metals such as electrolytic tinplate have been difficult to cover with adhesive resin systems. In particular, electrolytic tinplate which is relatively inert and therefore excellent for manufacture of sanitary cans for containing certain foods without additional inside coatings, can not be decorated with an ultraviolet light activated ink or some conventional inks. While it is known that organic titanates are useful for reducing the drying time of printing inks because the titanates catalyze the crosslinking of certain unsaturated resins and drying oils it was not known until the present invention to use titanate and ultraviolet treatment to condition the surface of an organic lubricant over electrolytic tinplate (ETP) such that subsequently applied ultraviolet activated inks could firmly adhere.

Currently, the industry uses solvent type inks containing alcohols or esters which must be driven off by baking, some of these however will not adhere to ETP. Such curing is wasteful of energy of petrochemicals and deleterious to the environment. The solvents tend to dissolve or dilute the lubricant or contaminants on the plate surface, thus allowing better contact between the ink solids and the metal surface, and some of the lubricant is volatilized during the thermal bake. Thus, the adhesion of some thermal inks on the tinplate is not affected by the lubricants or contaminants. The problem with the use of ultraviolet activation for high speed ink curing (by solidification of the monomeric ink resin) is that such curing is instantaneous and traps the mobile surface constituents and the lubricant and thus adhesion to the metal surface is poor. The commonly used lubricants are acetyl tributyl citrate, dioctyl sebacate or butyl stearate all of which are relatively nonoxidizing liquids. When they are applied to the metals at a rate of 0.17-0.28 grams per 62,720 square inches of surface, a coating is formed slightly in excess of a monomolecular layer which acts to increase mobility and prevent abrasion during handling and shipment. Bare tinplate surfaces usually contain electrolytically deposited chromium or its oxides which passivates the tin surface to prevent tin oxide growth in warm, humid environments. In the past such metal surfaces were frequently flame or corona treated to reduce or oxidize organics, however, these techniques are slow and energy intensive and require capital investment for expensive line equipment and space in the plant.

SUMMARY OF THE INVENTION

Application of a titanate ester primer to cover the lubricants, contaminants, chromium and its oxides and subsequent treatment with ultraviolet light transforms the surface permitting subsequent application of ultraviolet or thermally cured inks or coatings. The bare surface of tinplate includes areas rich in chromium oxides and others of pure tin oxides both of which become coated with an attached layer of hydrated titanium dioxide gel and thereby provides a satisfactory adhesive base for subsequent inks or coatings. The ultraviolet treatment appears to catalytically improve adhesion to the chrome rich areas.

While organic titanates are known for use in promoting the adhesion of inks or coatings to metal surfaces and have been used as primers or to modify inks and coatings, such use of titanates alone has never been tried solely in conjunction with ultraviolet light activation for oxidative polymerization of nondrying oils and for accelerated hydrolysis of titanate esters. Activation, by ultraviolet radiation of organic titanate over lubricated metallic surfaces prior to printing or coating prepares such surfaces for reception of a subsequently applied ink or coating. The application of ultraviolet energy subsequent to priming with an organic titanate improves the bonding of same to the substrate and the bonding of inks and coatings subsequently applied thereover.

Titanate esters or chelates can be applied to metal surfaces including those lubricated, such as electrolytic tinplate, tin free steel, tin, stainless steel, chrome plated steel, galvanized steel and aluminum by application from solvent mixtures or by direct contact. High speed exposure to ultraviolet light at a density of 200 watts/in. while moving the metal at about 110 ft./min. to adequately activate the reaction of the titanate with the surface. The treated surfaces form adhesive bonds for any coating system including acrylic or epoxy systems which are subsequently applied to the ultraviolet treated titanate.

DETAILED DESCRIPTION OF THE DRAWINGS

Figure 1:
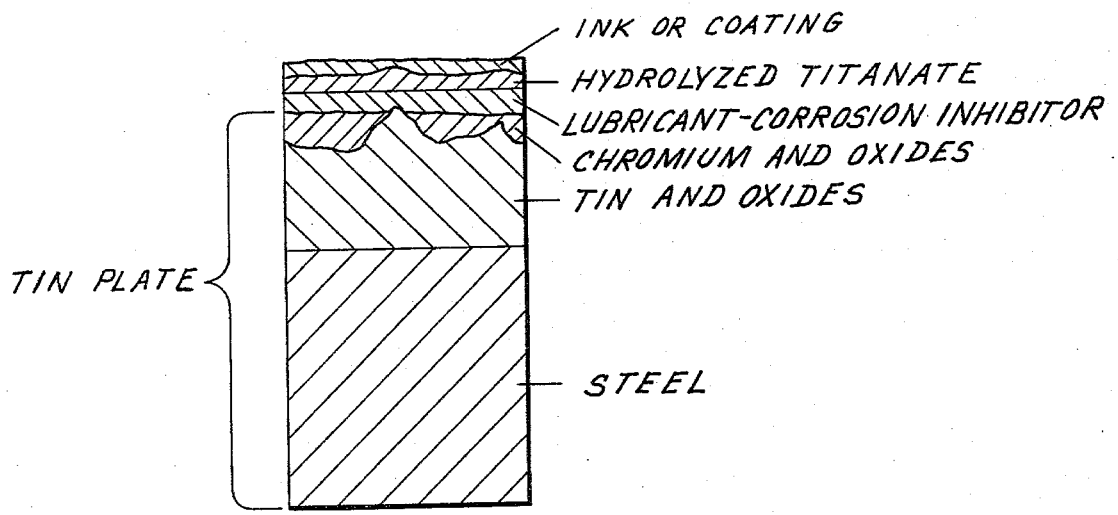
FIG. 1 is a cross-sectional view (not to scale) of lubricated electrolytic tinplate having an organic titanate primer and an ink coating thereover.

FIG. 1 shows an enlarged cross-sectional view of a piece of electrolytic tinplate which has been treated in accordance with the technique disclosed. More particularly the steel surface is covered by a layer of electrolytically deposited tin which may have a small amount of tin oxide on its surface, over which is deposited a discontinuous layer of chromium and/or chromium oxide by cathodic treatment in a sodium dichromate solution. As a result the surface of the electrolytic tinplate has areas which are rich in tin and its oxides. Such material is prepared at the steel mill for the purpose of making cans and can be ordered with varying weights of steel plate by the can makers convention of so many pounds of steel per base box which equals 31,360 square inches of plate with 62,720 square inches of surface (both sides). The amount of electrolytically deposited tin is designated by a fraction of a pound per base box (62,720 square inches) and more particularly one-quarter pound per base box would be designated #25 and one-half pound per base box #50, etc.

In order to provide surface mobility to prevent abrasion during shipping or handling of the tinplated steel the steel mills usually deposit electrostatically onto the tinplate surface a very thin coating of lubricant such as acetyl tributyl citrate, dioctyl sebacate or the like, thus, the material as received has a lightly oiled metallic surface having areas of tin and its oxide and areas of chrome and its oxides. To the lubricated surface is applied a relatively thin layer of a titanate primer. The primer is treated with ultraviolet light which prepares the surface of the tinplate to receive subsequently applied decorative inks or coatings as shown in FIG. 1, increasing the rate of titanate reaction with the surface.

Figure 2:
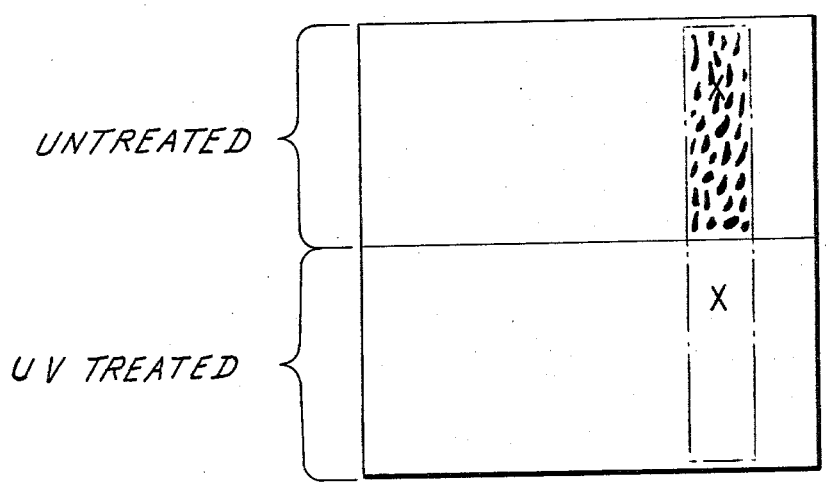
FIG. 2 is a representation of a strip of metal the lower half of which has been treated by ultraviolet radiation after titanate priming and before application of the ink while the titanate primer on the other half was air cured but not subjected to ultraviolet. Tape applied across both areas removed the subsequently applied ink on the untreated half and left uneffected the irradiated half.

The sample of FIG. 2 was prepared by taking the tinplate as received from the steel mills with its surface lubricant and dipping same in a solution of titanate primer and Skelly C (heptane). The sample was then air dried and one-half was treated with ultraviolet radiation by passing it at about 110 feet per minute under a 200 watt per inch mercury arc lamp in an elliptical focusing reflector, thus irradiating the surface for a fraction of a second. Masking was used so that only the lower half of the sample received the ultraviolet radiation. Subsequent to the ultraviolet light treatment a decorative ink was applied to the entire sample and was cured by ultraviolet light. The sample was then tested with a pressure sensitive adhesive tape. More particularly, a one inch strip of 3M tape #610 was applied to the surface of the decorated sample so as to equally cover a portion which had received the ultraviolet cured titanate primer and another portion which had received the primer without ultraviolet curing. The tape was pressed to the surface with sufficient pressure to make complete contact (removing the air bubbles therebetween). The tape test required that the tape be quickly pulled from the decorated sample in an effort to peel with it any poorly adhering ink or coating. As shown in FIG. 2, the tape removed substantially all of the ink, therebetween, on the upper portion which did not receive the ultraviolet primer curing but had little effect on the lower portion which was ultraviolet cured. In order to further test peeling, X's are scribed on the surface across to which the tape is to be applied. These X's present a freshly made scored edge which would help to initiate any peeling that might occur. As apparent, in FIG. 2, there is no peeling of the coating which is over the ultravioletly cured titanate primer.

Titanate Application

Titanate esters such as tetra-isopropyl, tetra butyl, tetrakis-2 ethyl hexyl titanates as well as chelate types such as the acetylacetonate complex were applied to tinplate using the following techniques.

EXAMPLE 1

Samples of metal strip (tinplate) were dipped in a two percent tetrakis-(2 ethyl hexyl) titanate (DuPont Tyzor TOT) in heptane solution, instantly air dried and exposed at somewhat less than one second to ultraviolet (200 watts/in.). They were then coated with M&T Red #2767 acrylic ink which polymerized when exposed to ultraviolet to cure the ink. Scotch type tape adhesion tests confirm a bond of the ink to the treated surface. Solutions of Tyzor TOT ranging from 0.5 to 5.0% were employed. Tinplate surfaces containing higher chrome contents work better with the higher titanate concentrations.

Table 1 shows the estimated adhesion after tape testing of M+T red ink for varying concentrations of Tyzor TOT. The electrolytic tinplate samples vary in terms of metallic surface structure. More particularly, the samples 77-65, 66 and 67 were obtained from one supplier of electrolytic tinplate; samples 77-124, 125, 126 and 127 were obtained from another electrolytic tinplate supplier and similarly 78-1, 2, 3 and 4 were obtained from still another supplier.

TABLE 1

| ADHESION TO TITANATE TREATED ETP W/WO UV | | | | | | | |
|---|---|---|---|---|---|---|---|
| % TOT→ | | Adhesion of M + T Red #2767 | | | | | |
| ↓ETP | Sample | 0.5% | 0.75% | 1.0% | 2.0% | 3.0% | 5.0% |
| 77-65 | N | 20% | 20% | 95% | 100% | 100% | 100% |
|  | Y | 100 | 80 | 100 | 100 | 100 | 100 |
| 77-66 | N | 0 | 10 | 90 | 99 | 100 | 100 |
|  | Y | 100 | 95 | 100 | 100 | 100 | 100 |
| 77-67 | N | 0 | 5 | 40 | 100 | 99 | 100 |
|  | Y | 100 | 99 | 100 | 100 | 100 | 100 |
| 77-124 | N | 100 | 100 | 100 | 100 | 100 | 100 |
|  | Y | 100 | 100 | 100 | 100 | 100 | 100 |
| 77-125 | N | 99 | 97 | 100 | 100 | 100 | 95 |
|  | Y | 100 | 99 | 100 | 100 | 100 | 95 |
| 77-126 | N | 95 | 98 | 100 | 100 | 99 | 75 |
|  | Y | 100 | 100 | 100 | 100 | 100 | 100 |
| 77-127 | N | 80 | 75 | 95 | 100 | 99 | 50 |
|  | Y | 100 | 90 | 100 | 100 | 100 | 100 |
| 78-1 | N | 0 | 5 | 50 | 100 | 99 | 95 |
|  | Y | 99 | 10 | 100 | 100 | 100 | 100 |
| 78-2 | N | 0 | 0 | 85 | 93 | 98 | 95 |
|  | Y | 95 | 0 | 100 | 100 | 100 | 100 |
| 78-3 | N | 0 | 0 | 0 | 95 | 95 | 40 |
|  |  | 40 | 0 | 75 | 100 | 100 | 100 |
| 78-4 | N | 95 | 95 | 99 | 99 | 98 | 100 |
|  | Y | 100 | 98 | 100 | 100 | 100 | 100 |

Controls with no treatment have 0% adhesion except 77-124 = 98%.
N - No UV treatment
Y - 1- pass 200 watts, 110 ft/min.

Table 2 is provided to illustrate the effects of different processing times and temperatures. The conditions are set forth at the top of the various columns and the different samples are arranged as in Table 1. The difference of adhesion is measured by tape testing each sample across a portion that received ultraviolet radiation of the titanate primer and another portion that did not.

TABLE 2

| EFFECT OF TIME AND TEMPERATURE ON ADHESION OF M + T RED TO TITANATE TREATED ETP SURFACES 2% Tyzor TOT | | | | | |
|---|---|---|---|---|---|
| SAMPLE | | INITIAL | 24 HRS. AMBIENT | 5 Sec. 120° F. | 30 Sec. 220° F. |
| 77-65 | N | 100% | 5% | 99% | 100% |
|  | Y | 100 | 100 | 100 | 100 |
| 77-66 | N | 99 | 50 | 50 | 99 |
|  | Y | 100 | 100 | 100 | 100 |
| 77-67 | N | 100 | 10 | 5 | 75 |
|  | Y | 100 | 100 | 100 | 100 |
| 77-124 | N | 100 | 100 | 100 | 100 |
|  | Y | 100 | 100 | 100 | 100 |
| 77-125 | N | 100 | 80 | 100 | 100 |
|  | Y | 100 | 100 | 100 | 100 |
| 77-126 | N | 100 | 0 | 100 | 100 |
|  | Y | 100 | 100 | 100 | 100 |
| 77-127 | N | 100 | 5 | 99 | 95 |
|  | Y | 100 | 100 | 100 | 100 |
| 78-1 | N | 100 | 5 | 0 | 10 |
|  | Y | 100 | 100 | 100 | 100 |
| 78-2 | N | 93 | 0 | 25 | 95 |
|  | Y | 100 | 100 | 100 | 100 |
| 78-3 | N | 95 | 0 | 0 | 0 |
|  | Y | 100 | 100 | 99 | 100 |
| 78-4 | N | 99 | 100 | 100 | 100 |
|  | Y | 100 | 100 | 100 | 100 |

N = No UV exposure
Y = 1 - pass 200 watts in²@ 110 ft./min

EXAMPLE 2

Samples of metal strip (tinplate) were dipped in a two percent DuPont Tyzor TPT (tetra isopropyl) in heptane solutions, instantly air dried and exposed for somewhat less than a second to ultraviolet (200 watts/in.). This particular titanate hydrolyzes rapidly giving off isopropyl alcohol. They were then coated with Acme Gold #M83679 acrylic ink which polymerized when exposed to ultraviolet to cure the ink. Scotch tape adhesion tests confirm a bond of the ink to the treated surface. Solutions of Tyzor TPT ranging from 0.5 to 5.0% were employed. Tinplate surfaces containing higher chrome work better with the higher titanate concentrations.

EXAMPLE 3—ROLL OR DRAW BAR COATING

Direct applications of the organic titanates by transfer roll or draw bar were evaluated at concentrations up to 100% titanate. The process included testing each concentration to determine if the adhesion was improved. It was found that Tyzor TBT (tetra n-butyl titanate) solutions of 0.5 to 5.0% work best. Higher titanate concentrations are required using this application method because the dip treatment method removes some of the lubricant, whereas direct coating leaves all of the lubricant on the samples.

EXAMPLE 4

Organic titanates such as Tyzor AA (titanium acetyl acetonate) were fogged electrostatically onto the tinplate with or without lubricant then activated with ultraviolet radiation (200 watts/in.) for somewhat less than one second. For fogging, the metal is subjected to an oppositely charged titanate and lubricant mixture which is atomized and dispersed towards the metal surface. Weights of titanate ester applications range from 0.25 gm to 2.5 gms per base box (62,720 square inches of surface). The treated combination provides a preserved and primed surface ready for coating, printing and subsequent forming.

REACTIONS OF TITANATES ON METAL OR POLYMER SURFACES

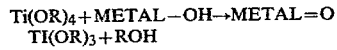

Ti(OR)$_4$+METAL—OH→METAL=O
Ti(OR)$_3$+ROH

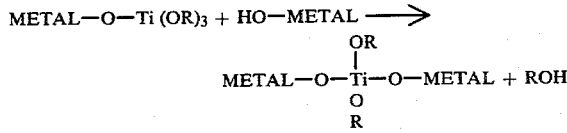

METAL—O—Ti (OR)$_3$ + HO—METAL ⟶

$$\text{METAL—O—Ti}\begin{array}{c}\text{OR}\\|\\\text{—O—METAL}\end{array} + \text{ROH}$$
$$\begin{array}{c}\text{O}\\\text{R}\end{array}$$

To explain the preceeding reaction, a chemical reaction between the titanates and the metal takes place. It is shown that the titanate, the metal and any ambient water vapors or hydroxyl groups react to first form a dimer and then crosslink to form a trimer becoming an insoluble polymer gel.

The "R" in the titanate is used to designate an alkyl group preferably a tetrakis (2-ethyl hexyl). However, it could be an isopropyl (see Example 2) or butyl. During the reaction alcohol is formed, released and evaporates. Evidence of alcohol can be smelled and verified by infrared analysis. What remains is a partly hydrolyzed insoluble titanate gel bonded to the metal.

The further reaction between the lubricant preservative (e.g. ATBC) and the ultravioletly radiated titanate might produce limited amounts of acetic acid which forms tin acetates between the titanate gel and the lubricated preserved material. When the reaction takes place in a oxidizing atmosphere an unsaturated intermediate is formed which reacts with either or both the partially hydrolized titanate ester and any freshly applied monomer (the Tyzor TOT) ester to form a crosslinked polymer structure.

While the preceding has dealt with various examples and techniques for applying titanate primers to lightly lubricated metal substrates, the invention in its broadest aspect is considered to include any type of organic titanate coating which is treated with ultraviolet light to form a surface to which subsequently applied inks or coatings will adhere. As such the titanate will act to prepare the surface for bonding by itself forming a good adherence with the sub-surface even though it is slightly lubricated and composed of various metals and their oxides. It is believed that the titanate can be applied in a number of different ways and still perform successfully as long as it is treated with ultraviolet light.

What is claimed is:

1. An applied primer covering a lightly lubricated metal substrate including various metals and their oxides to form a surface for receiving a subsequently applied coating said primer consisting essentially of a thin film of organic titanate treated momentarily with ultraviolet radiation.

2. The primer of claim 1 wherein the organic titanate is tetrakis(2-ethyl hexyl)titanate and the ultraviolet treatment is momentarily applied at a watt density sufficient to activate the thin film of titanate.

3. The primer of claims 1 or 2 wherein the metal substrate is electrolytic tinplate and the titanate is applied by a solution with a solvent.

4. The primer of claim 2 wherein the titanate solvent is heptane and the application of the ultraviolet light activation increases the rate of reactivity of the titanate with said metal surface.

5. The primer of claim 3 wherein said subsequently applied coating is an ultraviolet cured ink.

6. The primer of claim 1 wherein the titanate is an ester.

7. The primer of claim 6 wherein the titanate is a tetra isopropyl ester and the ultraviolet light treatment is momentarily applied at a watt density sufficient to activate the thin film of titanate.

8. The primer of claim 6 wherein the titanate is a tetra n-butyl ester and the ultraviolet light treatment is momentarily applied at a watt density sufficient to activate the thin film of titanate.

9. The primer of claim 1 wherein the titanate is a chelate type.

10. The primer of claim 9 wherein the chelate is an acetylacetonate complex which is subsequently treated momentarily with ultraviolet light applied at a watt density sufficient to activate the thin film of titanate.

11. A method of priming a lightly lubricated sheet of electrolytic tinplate without removing the lubricant for preparing it to receive a post coating including the steps of:
  a. dipping said strip in a titanate-heptane solution sufficient to lightly coat the surface with the solution;
  b. permitting the solvent to evaporate leaving a titanate film over the surface, and
  c. momentarily exposing the surface to ultraviolet light at a watt density sufficient to photo-activate the titanate surface coating.

12. The method of claim 11 wherein the titanate concentration by weight represents 0.5 to 5.0% part of said solution.

13. The method of claims 11 or 12 wherein the titanate is tetrakis(2-ethyl hexyl) and is at a concentration of 2% by weight in said solution.

14. A method for applying a titanate primer to lightly lubricated tinplate without removing the lubricant for preparing it to receive a subsequent applied coating including the steps of:
   a. charging the primer with an electrostatic charge while atomizing same for dispersion;
   b. charging the tinplate with an electrostatic charge of opposite polarity to that impressed upon the primer;
   c. dispersing the charged and atomized primer toward the tinplate to coat same, and
   d. subjecting the coated tinplate to a brief exposure of ultraviolet radiation to photo-activate the surface.

15. The method of claim 14 wherein said titanate primer includes a lubricant.

16. A method for applying a primer including a titanate and a ester-type lubricant to tinplate for preparing it to receive a subsequently applied coating including the steps of:
   a. charging the primer with an electrostatic charge while atomizing same for dispersion;
   b. charging the primer with an electrostatic charge while atomizing same for dispersion;
   c. dispersing the charged and atomized primer toward the tinplate to coat same, and
   d. subjecting the coated tinplate to a brief exposure of ultraviolet radiation to photo-activate the surface.

* * * * *

UNITED STATES PATENT AND TRADEMARK OFFICE
CERTIFICATE OF CORRECTION

PATENT NO. : 4,228,221
DATED : Oct. 14, 1980
INVENTOR(S) : Stanley E. Rohowetz

It is certified that error appears in the above—identified patent and that said Letters Patent are hereby corrected as shown below:

Column 8,
Claim 16 should read in its entirety as follows:

16. A method for applying a primer including a titanate and a ester-type lubricant to tinplate for preparing it to receive a subsequently applied coating including the steps of:
   a. charging the primer with an electrostatic charge while atomizing same for dispersion;
   b. charging the tinplate with an electrostatic charge of opposite polarity to that impressed upon the primer;
   c. dispersing the charged and atomized primer toward the tinplate to coat same, and
   d. subjecting the coated tinplate to a brief exposure of ultraviolet radiation to photo-activate the surface.

Signed and Sealed this

Twenty-fourth Day of August 1982

[SEAL]

Attest:

GERALD J. MOSSINGHOFF

Attesting Officer    Commissioner of Patents and Trademarks